Patented Oct. 26, 1948

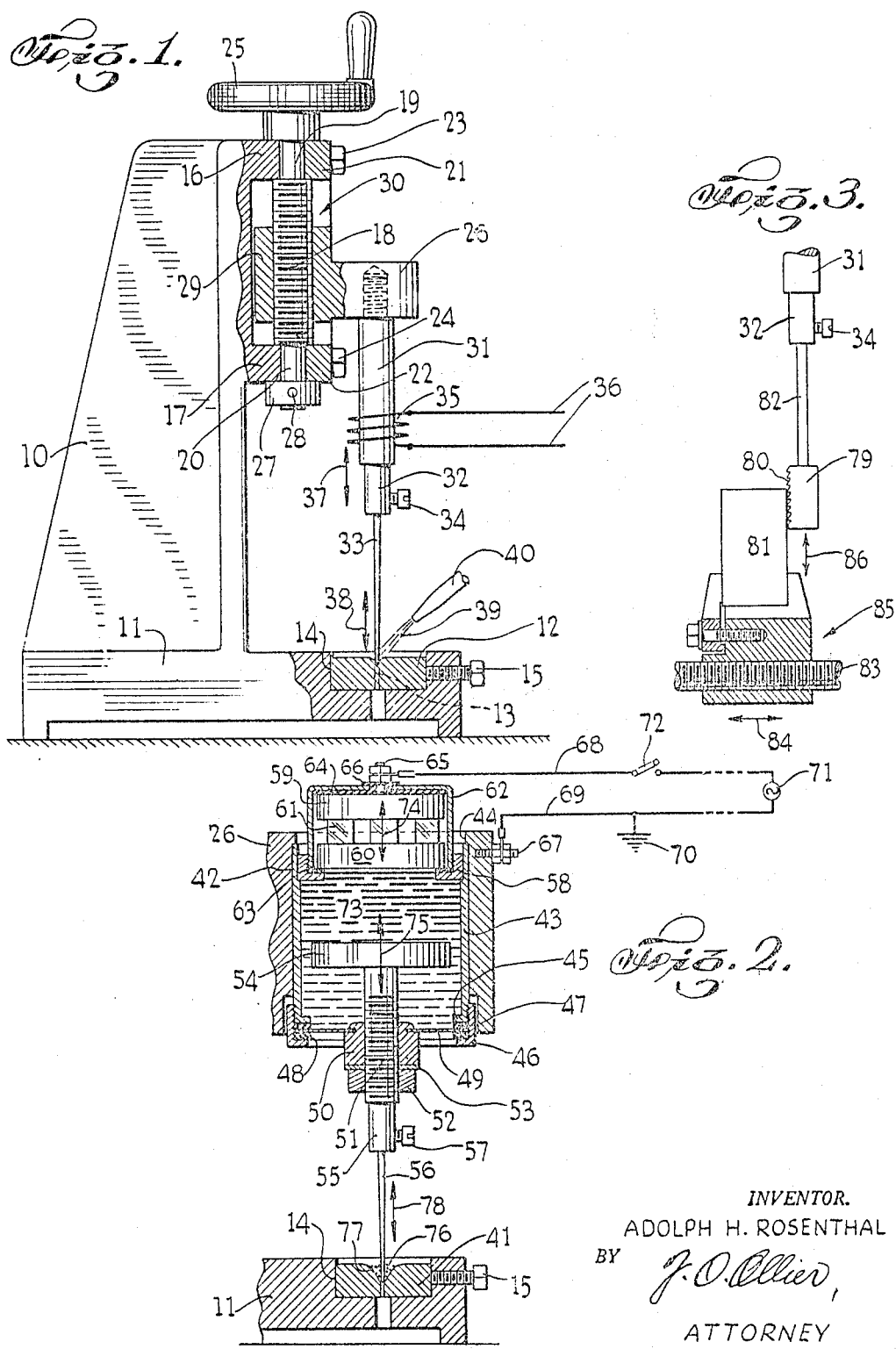
Oct. 26, 1948.       A. H. ROSENTHAL       2,452,211
MACHINE FOR MECHANICALLY WORKING MATERIALS
Filed Oct. 17, 1944
INVENTOR.
ADOLPH H. ROSENTHAL
ATTORNEY

2,452,211

UNITED STATES PATENT OFFICE 2,452,211

MACHINE FOR MECHANICALLY WORKING MATERIALS

Adolph H. Rosenthal, New York, N. Y., assignor to Scophony Corporation of America, New York, N. Y., a corporation of Delaware Application October 17, 1944, Serial No. 559,079

3 Claims. (Cl. 51—59)

This invention relates to a method and machine for operating a tool for boring, sawing, lapping, broaching, planing and other mechanical working of a work piece or blank.

According to the invention, an electrically excitable vibratory element is caused by electric oscillatory energy to vibrate mechanically at high, supersonic resonance frequency, and these mechanical vibrations are imparted to a tool or work essentially in the direction in which material is to be removed from the work and while the latter is being engaged by the tool.

It is therefore an object of the invention to remove material from a work by causing the tool to vibrate mechanically at high, supersonic frequency in a direction essentially parallel to the path in which material is to be removed.

It is another object of the invention to remove material from a work along a predetermined path or face by an electrically excited and adjustable vibratory action at high, supersonic frequency of the tool upon the work along that path or face.

It is another object of the invention to remove material from a work along a predetermined line or face by the electrically excited vibratory action at supersonic, high frequency of a tool fed along that line or face in one or more reciprocating feed strokes.

It is still another object of the invention to increase the accuracy and efficiency of removing material from a work, and thereby shaping the latter by means of a boring, sawing, lapping, etc. tool.

These and other objects of the invention will be more clearly understood as the specification proceeds with reference to the drawings in which Fig. 1 shows rather schematically a vertical cross section with parts in elevation of a machine for boring a hole through a work piece, Fig. 2 in similar way the working parts of a machine for lapping a hole already drilled through a work piece, and Fig. 3 operative elements of a sawing, milling, planing or grinding machine.

Referring to the exemplification of the invention shown in Fig. 1, a frame 10 including a base 11 is provided with a chuck or mounting fixture of any suitable type for holding the work or blank 12. For simplicity's sake, this fixture is shown to consist of a recess 14 in the base to receive work 12 in which a bore 13 is to be drilled; work 12 is clamped therein in fixed position by one or more set screws 15.

A feed screw and spindle 18 is journalled on both ends in split bearings 16, 17, the caps 21, 22 of which are held in position by bolts 23, 24. On the end of spindle 18 projecting beyond bearing 16, a hand wheel 25 is mounted, whereas on its other end 20 projecting through bearing 17, a collar 27 is fixed by pin 28.

A tool support 26 includes a bushing 29 screw threaded on the inside and engaging feed screw 18. Bushing 29 contacts and glides on ways 30 spaced from feed screw 18 and arranged parallel to its axis on opposite sides so that upon turning feed screw 18 in one or the other direction by means of hand wheel 25, the support is moved up- or downwardly along those ways for feeding the tool toward the work or withdrawing the tool therefrom.

A rod 31 is mounted in support 26 by means of its screw threaded end, and is provided on its opposite end with a head 32 in which a tool 33 can be removably mounted, for instance clamped by means of screw 34.

Rod 31 consists of ferromagnetic material of the type which under the influence of a magnetic flux passed therethrough longitudinally exhibits magneto-striction effects. If the magnetic flux varies periodically in its intensity, this magneto-striction causes longitudinal dilations and contractions of the rod in the frequency of the recurrent variations in intensity of the magnetic flux acting upon the rod, and results in mechanical vibrations of the rod in its longitudinal direction, i. e. parallel to its axis. Ferromagnetic materials exhibiting this property are for instance nickel or nickel alloys, such as known under the trade names "Invar" and "Monel metal."

In order to excite rod 31 to mechanical vibrations of this type, coil 35 is positioned at a proper place around the rod and fed through conductors 36 with an exciting alternating electric current of the frequency at which mechanical vibrations of maximum amplitude can be produced in rod 31, i. e. the resonance frequency of the rod. Oscillating currents of this type can be produced by well known generators, for instance a tube oscillator circuit, such as a Hartley circuit. By tuning the tube oscillator, the frequency of the oscillating current produced can be adjusted in wide range. Its amplitude can be controlled by varying for instance the grid bias of a generator or amplifier tube in the oscillatory circuit and thereby the energy supplied to coil 35 and the intensity of the mechanical vibrations of rod 31 adjusted.

If rod 31 is thus excited to mechanical vibrations in its longitudinal direction, an oscillation node develops at the place where the rod is mounted in support 26, whereas its freely projecting end connected with head 32 vibrates mechanically at maximum amplitude in the direction of double arrow 37 if the dimensions of the rod of given composition are chosen so that its length between its ends corresponds to substantially ¼, ¾, 5/4, etc. wave lengths. The frequencies at which such maximum amplitudes of vibrations are obtained are the fundamental resonance frequency of the rod or vibratory magneto-striction element and its higher harmonics. They are chosen according to the invention within high, supersonic frequency range and amount to between about 30,000 to 1,000,000 vibration cycles per second.

The mechanical vibrations occurring at the free end of rod 31 are translated to head 32 rigidly connected therewith and by the latter upon tool 33. The masses of head 32 and tool 33 thus mechanically coupled with rod 31 will naturally codetermine the resonance frequency of the whole oscillating unit of which they form a part, and it is easy to adjust the frequency of the exciting oscillatory current supplied to coil 36 to proper resonance with this mechanical unit.

After the work or blank 12 has been positioned and clamped into the mounting fixture, the exciting current is applied to coil 35, and support 26 and thereby tool 33 are lowered upon it by turning hand wheel 25. Thereby vehement mechanical vibrations of the working tip of tool 33 are produced in the direction of double arrow 38 and as soon as the tool tip contacts work 12, a hole is started therein by the mechanical hitting and carving action of the tool tip at the high, supersonic frequency stated hereinbefore. Support 26 and thereby tool 33 are fed downwardly by continued rotation of feed screw 18 until the tool tip has completed hole 13 through work 12. Thereafter the tool is withdrawn from the work by rotating spindle 18 in the opposite direction and the exciting current is shut off.

It will be appreciated from the above that in this manner a bore is produced by means of a tool operated in the longitudinal direction of the bore only, without turning the tool. In order to remove the dust-like material carved out by the intense hitting action of the tool point at supersonic frequency, a stream of a liquid or gaseous coolant can be directed upon the upper surface of work 12 from a nozzle 40.

It should be understood that the dimensions of head 32 and tool 33 in practice will be made as small as possible in longitudinal direction and those shown in the drawing are rather exaggerated for clarity's sake. Tool 33 can consist of any suitable material, such as hardened steel or a composition known under the trade name "Stellite," for instance on a cobalt-chromium-tungsten base to which sometimes molybdenum and other alloying metals are added. The tool can also be provided in special cases with a working tip of particularly hard and tough material, such as cemented carbide or a diamond. The tip can be conical and pointed or wedge-shaped, depending on the shape of the bore 13 to be produced. The tip can be smooth or finely saw-toothed.

The vibrational displacement caused by magneto-striction effects is very small, of the order of a few thousandths of an inch, so that the tool tip or edge removes minute amounts of material only at each hit or impact; these hits follow one another, however, extremely rapidly at the high supersonic frequency stated hereinbefore wherefrom the surprising effect of the invention and rapidity of work results. The power of each impact depends on the energy by which the mechanical vibrations of rod 31 are produced, which in turn depends on the intensity of the magnetic fluxes passed therethrough. By adjusting the energy of the exciting oscillatory current therefore also the intensity of each impact of the tool edge or tip upon the work at each hit can be adjusted.

It is within the scope of the invention to interpose an electrically excitable vibrator between the mounting fixture for the work and base 11 instead of between the tool holder and its support, to the effects hereinbefore described, and particularly if a work of small mass, for instance a small die or diamond is to be bored.

It is understood by anybody skilled in the art that instead of a manual feed an automatic one can be provided by which the tool is fed toward and through the work at predetermined speeds and withdrawn after the bore is completed. Work 12 can be either bored through entirely or only to predetermined depth. Instead of feeding the tool holder by its support toward and from the work, as shown, of course the mounting fixture with the work can be fed toward and from the tool, or both kinds of feeds combined, as well known per se with machines of this type.

Instead of using a vibratory member or members operating on magneto-striction effects, also a vibrator utilising piezo-electric effects can be used for producing the vibratory movement of the tool at supersonic high frequency of the order stated hereinbefore. This is illustrated in Fig. 2 which exemplifies the utilisation of the invention for lapping a hole in a wire drawing die produced previously in any manner. Dies for drawing very fine wires, such as of tungsten and molybdenum or their alloys, are usually made of cemented carbide of extreme hardness or include a commercial diamond in which a fine hole is bored and are to be lapped thereafter in order to obtain greatest smoothness of the hole. Furthermore, when costly dies of this type are worn out in operation, they are usually lapped in order to restore uniformity and smoothness of the hole; thereby the hole is slightly enlarged and the die thereafter used in a draw for producing a somewhat larger diameter than previously obtained by the same die.

Reverting to Fig. 2, a die 41 is clamped in a chuck or other fixture 14 of base 11 by means of set screw 15 in a manner similar to that shown in Fig. 1. Tool support 26 otherwise the same as in Fig. 1, is provided with a hole 42 in which a vibratory unit utilizing piezo-electric effects is mounted.

It consists of a shell 43 tightly fitted into hole 42 and abutting against a shoulder 44. Shell 43 is provided at its lower end with an inwardly projecting rim 45 and screw threaded on the outside, and a cap 46 is screwed thereon. Annular washers 47, 48 are positioned between the outside of rim 45 and the inside of the rim of cap 46, and hold, liquid-tightly clamped between them, an annular sheet-like diaphragm 49, preferably of flexible and springy metal, such as beryllium bronze, or steel. A bushing 50 screw-threaded on its inside is liquid-tightly mounted within a center hole of diaphragm 49 and a screw-threaded spindle 51 passed therethrough and liquid-tightly held in adjusted position by nut 52 and preferably resilient washer 53, e. g. a lock washer. On the inner end of spindle 51 and immersed in the liquid 73 a circular metallic disk 54 is mounted, while the outer end of spindle 51 is provided with a head 55 in which a lapping tool 56 is removably mounted, for instance clamped by set screw 57. An annular ring 58 is mounted in a recess of shell 43, for instance by tight or shrunk fit, is screw-threaded on its inside and serves as a support for a vibratory element operating on the piezo-electric principle. This element consists in this exemplification of two circular steel plates 59, 60 between which a number of pieces 61 of piezo-electric material is mounted, for instance cemented on their top and bottom to the steel plates 59, 60.

It is well known in the art that crystals of certain substances, such as quartz, tourmaline, Rochelle salt exhibit piezo-electric effects, i. e. vibrate mechanically under the action of oscillating electrical energy applied to them in distant planes perpendicular to a polar axis of the respective crystal. The polar axes of such crystals can be ascertained by well known methods, and a plate of rectangular or square cross section cut from the crystal in such a manner that two distant parallel surfaces of the plate are perpendicular to the selected polar axis ("Curie cut"). If oscillating electric potentials are applied to the cut piece on those parallel surfaces and the frequency of these oscillations equals substantially the resonance frequency of the cut piece, vehement vibrations of the latter in that resonance frequency are produced. The vibrations consist in recurrent contractions and expansions of the piece in a direction perpendicular to these surfaces, so that the distance between the latter is recurrently reduced and increased; such vibrations are known as "thickness" vibrations of the piece. Instead of these thickness or longitudinal vibrations of the kind just described, transverse vibrations parallel to the planes can be produced and may be utilized; in the latter case, the length of the piece between the planes will periodically increase and decrease. However, for all practical purposes thickness vibrations are preferred.

The resonance frequency of a piece depends upon the crystal material from which it is cut and its dimensions; if other members of a different material are rigidly connected with the piece or several pieces to form a unitary element, the resonance frequency depends on the thicknesses, masses and sound velocities of the members. Since the sound velocity of steel is practically the same as that of quartz, a rigid combination of quartz elements and steel members oscillates as one unit with a resonance frequency determined by the total thickness and shape of the combined element.

The resonance curve of the oscillations of any such vibrator is extremely sharp, and it is therefore necessary that the frequency of the applied exciting electric vibrations equals or almost equals that resonance frequency, or that it is a harmonic, preferably odd harmonic thereof.

The energy of the mechanical vibrations thus excited depends on the energy of the applied electric oscillations and can therefore be regulated within wide range in an exclusively electric manner.

The pieces 61 are cut from such piezo-electric crystal material, preferably quartz, in such a manner that their surfaces contacting steel plates 59, 60 are parallel and perpendicular to a polar axis in the direction of which the cut piece is capable of thickness vibrations.

The vibrator unit just described is mounted in a metallic cap 62 screwed into ring 58. A resilient washer 63 of electrically conductive material, such as soft copper, is clamped between the inwardly projecting rim of ring 58 and the lower end of cap 62, so that the vibrator element is firmly held within cap 62 between washer 63 and a plate-like insulation 64, for instance of mica, fibre or the like, on top.

A screw-threaded terminal rod 65 is connected with steel plate 59 and passed through a hole in insulation 64 and another insulation 66, for instance of insulating plastic or ceramic material, so that plate 59 and terminal 65 are completely insulated from cap 62. Another terminal 67 is mounted on support 26 and electrically connected with plate 60 through the metallic support, shell 43, ring 58 and washer 63. A conductor 68 is clamped onto terminal 65 and another conductor 69 (which may be grounded at 70) is clamped onto terminal 67. Any suitable source of high frequency current 71 is connected between conductors 68, 69 and can be switched in and out by means of switch 72. The space within shell 43 is filled with a suitable sound propagating liquid 73, such as oil.

The total thickness of the vibratory unit 59, 60, 61 is chosen so that its resonance frequency at which it mechanically vibrates in the direction of double arrow 74 (thickness-vibrations) is within high, supersonic range between about 30,000 to 1,000,000 vibration cycles per second. Calculation shows that at a total thickness of 5 mm. or 10 mm., a resonance frequency of respectively about 600,000 and 300,000 vibration cycles per second can be obtained at which, as it is repeated, the entire element contracts and dilates recurrently in the direction of double arrow 74 at that frequency. In order to excite those resonance frequencies, the oscillatory currents supplied by source 71 must be essentially of the same frequency because the resonance frequency of the vibratory element forms a sharp curve. However, the exciting frequency may also be a higher odd harmonic of the fundamental resonance frequency.

The mechanical vibrations of the lower surface of plate 60 are translated upon the contacting liquid 73. Mechanical waves of high, supersonic frequency within the range stated hereinbefore progress mainly in a direction perpendicular to the exciting surface, are highly directed and do not substantially spread laterally. Hence the mechanical vibrations of the lower surface of plate 60 are translated upon and through liquid 73 in a direction essentially perpendicular to that exposed surface and travel toward the upper surface of the immersed disk 54 the area of, which, for the reasons just stated, need not exceed considerably the area of the lower surface of plate 60 contacted by the liquid 73 within the circular aperture of ring 58. The distance between the lower surface of plate 60 and the upper surface of disk 54 should be preferably such, that a standing wave results in the liquid upon reflection of the waves by disk 54.

In this manner and very efficiently, i. e. with least loss of energy, the vibrating energy of the vibrator element is translated through liquid 73 upon disk 54. Thereby disk 54 is caused to vibrate in the direction of double arrow 75 at the same frequency as the vibratory element and takes with it rod 51, head 55 and tool 56. These vibrations the excursions of which are very small, around a few thousandths of an inch, are permitted and followed by the resiliency of diaphragm 49.

Since a lapping action is desired, abrasive powder or paste 76 is provided between the end of tool 56 and the hole 77 of the die 41.

In operation, support 26 is fed toward work 41 so far that the end of the lapping tool 56 enters the hole 77 and the abrasive powder therein, after oscillatory currents have been supplied to the vibratory unit from source 71 by closing switch 72. The vibrations of the vibratory unit are translated upon tool 56 which therefore vehemently vibrates in the direction of double arrow 78 and produces the desired lapping action. Whereas tool 33 in Fig. 1 is mounted rigidly in support 26, a kind of floating mount is provided by the embodiment of the invention according to Fig. 2 which enhances the desired lapping rather than boring action. While lapping proceeds rapidly, support 26 and thereby tool 56 can be fed further toward work 41 and into hole 77, so that lapping can progress to any desired depth of hole 77. After this operation has been completed within a fraction of a minute or a few minutes, the lapping tool is withdrawn by raising support 26 and the oscillatory energy is shut off by opening switch 72.

It should be understood that the two methods described herein with respect to Figs. 1 and 2 can be combined in that according to the first method the hole is drilled in the drawing die, and this hole lapped thereafter according to the second method.

It is within the scope of the invention to mount in tool holder 32, Fig. 1, or 51, Fig. 2, any other type of tool than exemplified therein for mechanically working a work piece and removing material therefrom. For this purpose the boring or lapping tools 33 or 56 shown in Figs. 1, 2 are to be replaced by another suitable tool for performing a sawing, milling, filing, grinding or reaming operation. Referring to Fig. 3 it is assumed that a machine of the type as shown in Fig. 1 is used. A tool 79 is clamped with its shank 82 into tool holder 32. The working face 80 of tool 79 engaging work 81 is saw-toothed, as shown, and tool 79 is blade-like if a sawing operation is intended. If a milling action is intended, the shape and thickness of the teeth of tool 79 correspond to those of the cutters of a miller. Similarly, by the use of teeth of proper width and shape at face 80 of tool 79, a planing operation can be performed on work 8. If face 80 of tool 79 is shaped like that of a file, a filing action can be obtained, and if face 80 is flat and of a composition suitable for grinding, e. g. comprising minute particles of silicon carbide embedded in a suitable metallic matrix, a grinding operation can be performed.

Suitable reinforcements for the back of tool 79, and means for feeding the work 81 toward the tool in the direction of arrow 84, such as a feed screw 83 engaging a chuck or mounting fixture 85 for the work, or other means well known for cross feeds, can be used.

In operation, tool 79 engaging work 81 is mechanically vibrated essentially in the direction of double arrow 86 and simultaneously fed longitudinally e. g. by means of spindle 18 and hand wheel 25. A cross feed is accomplished in the manner indicated above.

It should be understood that the invention is not limited to the exemplifications hereinbefore described and shown in the drawings, but is to be derived in its broadest aspects from the appended claims.

What I claim is:

1. In a machine for operating a tool, an enclosure, a body of liquid within said enclosure, a member immersed in said liquid, a tool holder outside said enclosure and connected through a wall thereof with said immersed member, and means for directing supersonic vibratory energy through said liquid to said member.

2. In a machine for operating a tool, an enclosure having a flexible wall, a body of liquid within said enclosure, a member immersed in said liquid, a tool holder outside said enclosure, means connecting said member and tool holder and supported by said flexible wall, and means for directing supersonic vibratory energy through said liquid to said member and tool holder.

3. In a machine for operating a tool, an enclosure with a vibratory diaphragm forming one wall thereof, a body of liquid within said enclosure, a member immersed in said liquid, a tool holder outside said enclosure, means extending through and supported by said diaphragm for connecting said immersed member and tool holder, and means for directing supersonic vibratory energy through said liquid to said member and tool holder.

ADOLPH H. ROSENTHAL.

REFERENCES CITED

The following references are of record in the file of this patent:

UNITED STATES PATENTS

| Number | Name | Date |
| --- | --- | --- |
| 1,318,466 | Taylor | Oct. 14, 1919 |
| 1,746,662 | Legge | Feb. 11, 1930 |
| 1,966,446 | Hayes | July 17, 1934 |
| 1,990,074 | Helmstadter | Feb. 5, 1935 |
| 2,070,944 | Hillix | Feb. 16, 1937 |
| 2,195,060 | Wallace et al. | Mar. 26, 1940 |
| 2,280,446 | Nyman | Apr. 21, 1942 |
| 2,304,793 | Bodine | Dec. 15, 1942 |
| 2,350,117 | Kline | May 30, 1944 |
| 2,354,347 | Peets | July 25, 1944 |
| 2,366,062 | Sengenberger | Dec. 26, 1944 |
| 2,384,435 | Bodine | Sept. 11, 1945 |

FOREIGN PATENTS

| Number | Country | Date |
| --- | --- | --- |
| 553,176 | Great Britain | May 11, 1943 |